Oct. 2, 1934.   W. W. HARTMAN   1,975,394
SYNCHRONIZING MECHANISM
Filed Jan. 17, 1931   6 Sheets-Sheet 1
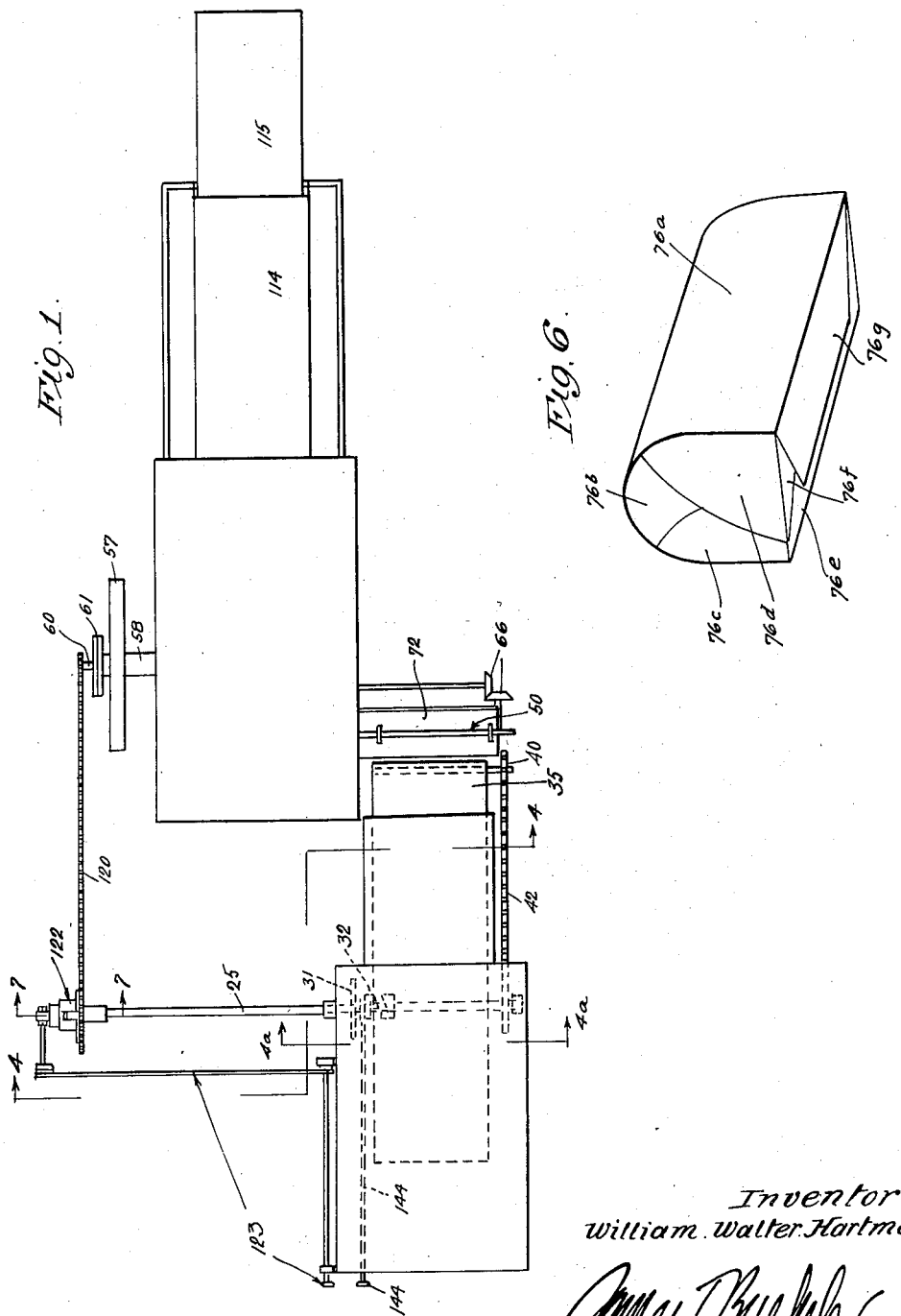
Inventor.
William Walter Hartman.
Attorney.

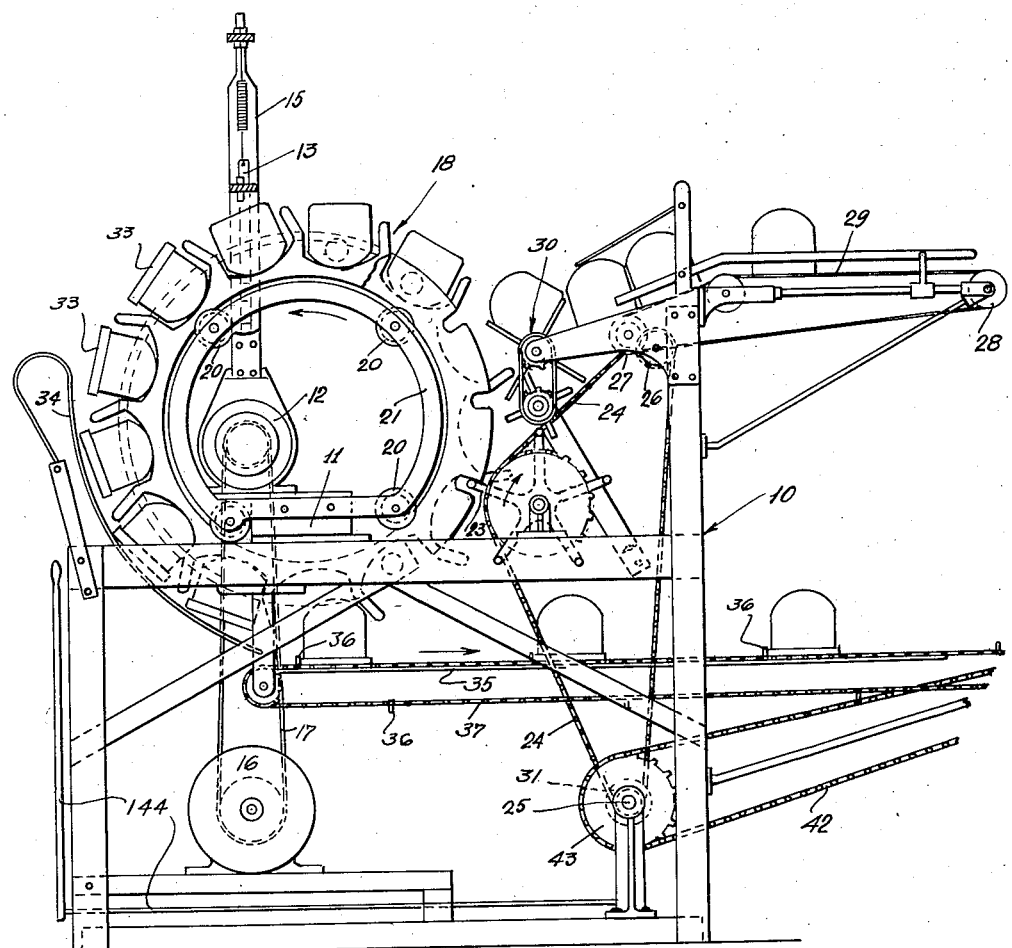

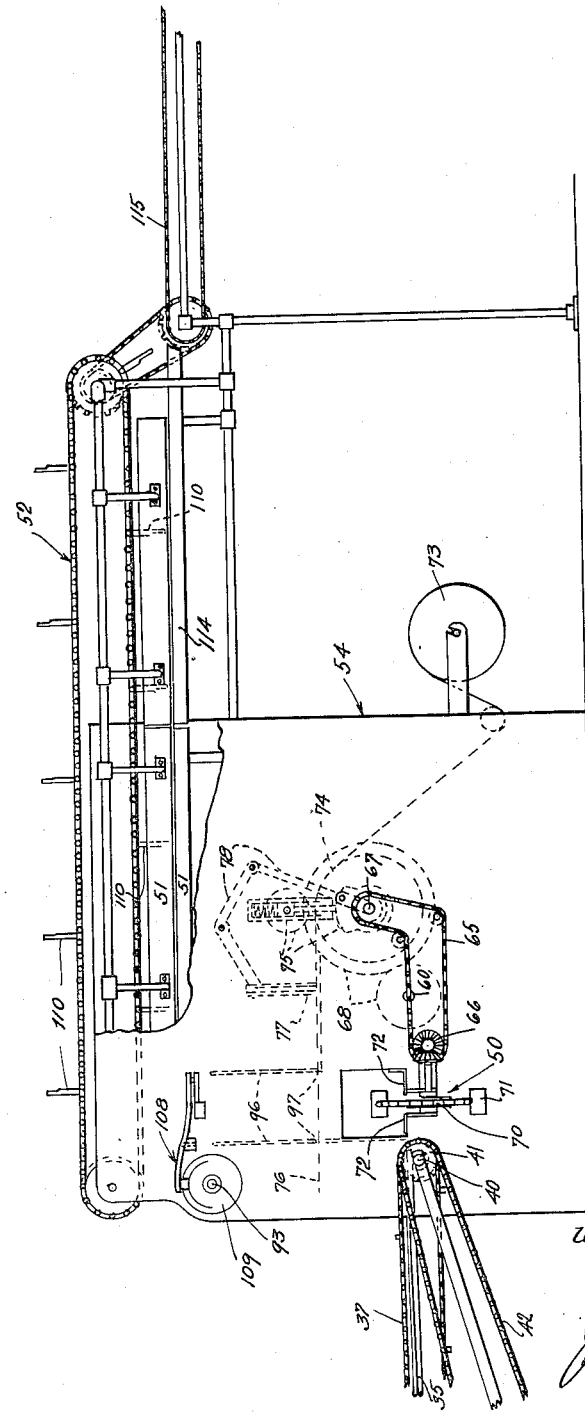

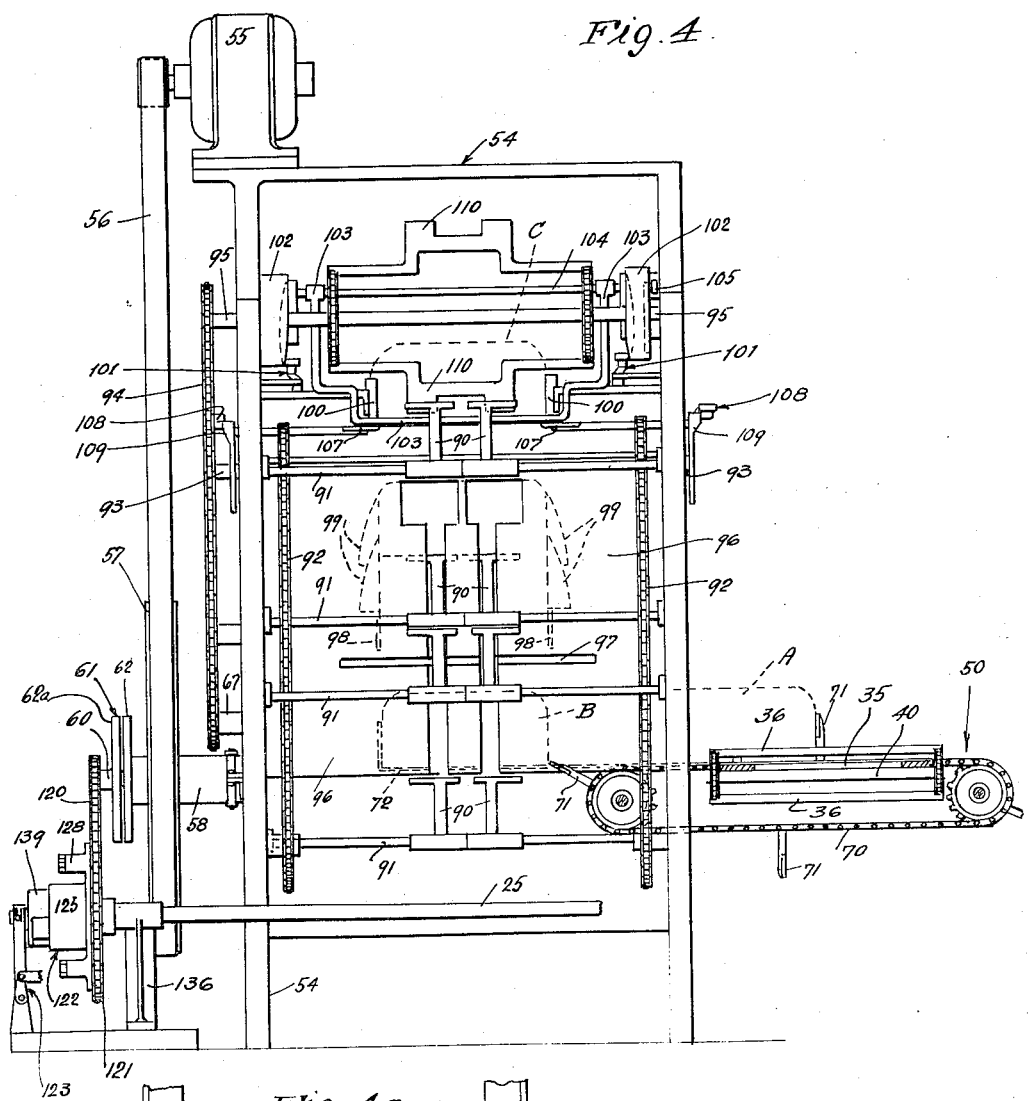

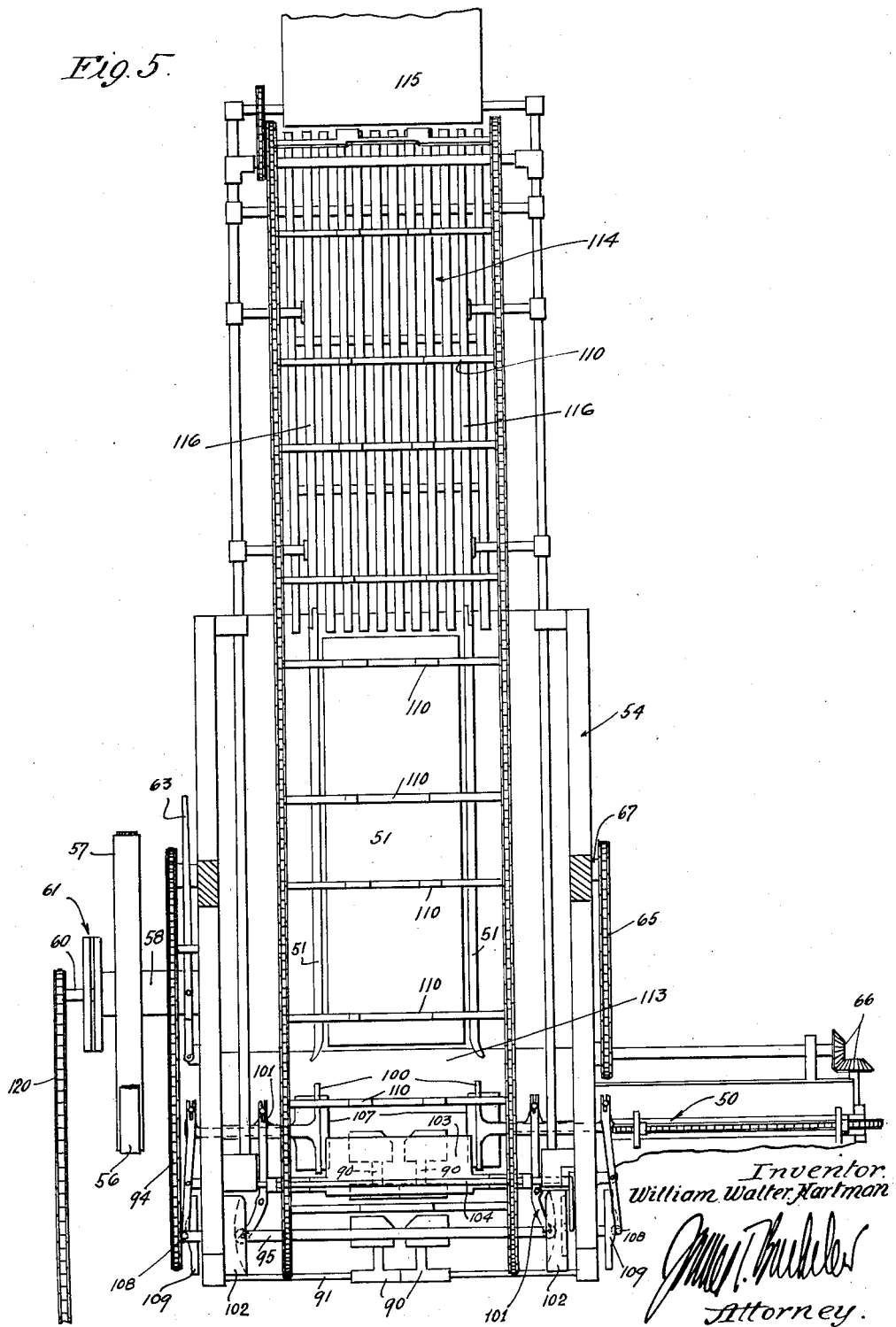

Oct. 2, 1934.   W. W. HARTMAN   1,975,394
SYNCHRONIZING MECHANISM
Filed Jan. 17, 1931   6 Sheets-Sheet 6
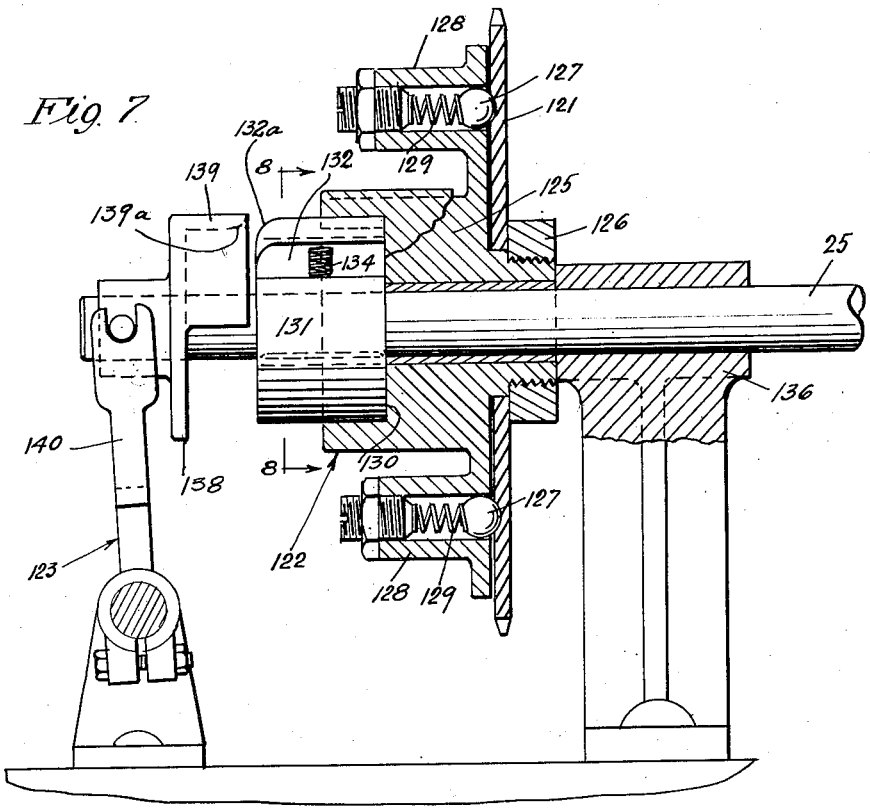
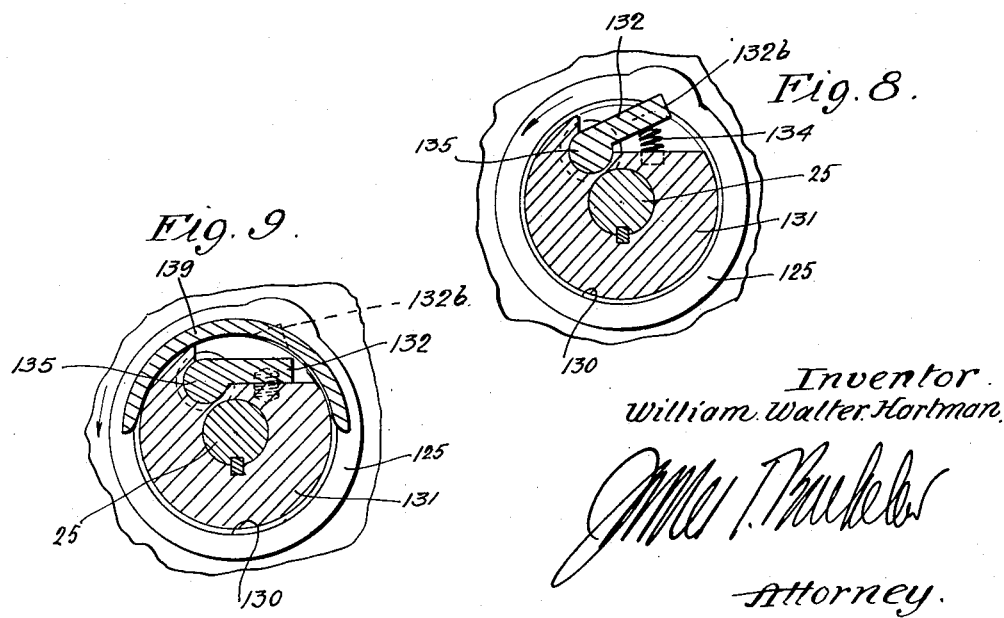
Inventor.
William Walter Hartman,
Attorney.

Patented Oct. 2, 1934

1,975,394

UNITED STATES PATENT OFFICE 1,975,394

SYNCHRONIZING MECHANISM

William Walter Hartman, Los Angeles, Calif.

Application January 17, 1931, Serial No. 509,425

20 Claims. (Cl. 93—2)

This invention relates to means for synchronizing the operation of two machines where the machines operate upon the same article in succession and are capable of independent operation, as is the case when a bread-slicer and bread-wrapper are connected to provide optionally a continuous feed of the bread through both machines. My invention relates also to a combination of such machines so synchronized.

When the slicer and wrapper are operated separately it is necessary for an operator to collect the sliced loaves as discharged from the slicer and place the loaves individually on the means to feed the bread into the wrapper. The interconnection of these two machines is desirable since by providing a continuous and uninterrupted path for the bread through both machines the necessity and cost of an operator to transfer the loaves from one machine to the other are eliminated and a higher rate of production can be maintained continuously. However, it is not sufficient that the slicer and wrapper merely be placed adjacent to one another so that the bread may pass directly from the slicer discharge to the wrapper feed, for the two machines are most likely operating at different rates and the bread is being presented to the wrapper either too slowly or too rapidly. Nor is it sufficient to merely drive the two machines from the same prime mover; for, although they can now be operated at the same rate, it is necessary to stop both if one is stopped; and this will stop loaves passing through the heated sealing plates of the wrapper with the result that said loaves will burn.

Thus it is a general object of my invention to provide a suitable means of synchronizing the operation of a slicer and a wrapper so that a continuous path for the bread is provided. Such means must permit the two machines to be operated at the same rate of speed. It also must permit the slicer to be stopped independently of the wrapper so that any bread in the wrapper will be passed therethrough without injury; yet if the wrapper or any part of the entire mechanism is stopped, all mechanism operating on the bread prior to the stopped mechanism must stop to prevent bread from piling up in some place and becoming damaged.

Also, it is essential for a practically useful device that portions of the slicer temporarily stopped can be simply and quickly started again in accurate synchronism with the wrapper. Therefore, it is a further object of my invention to provide such a synchronizing means that, if a portion of the mechanism is stopped and again started, the engaging means will automatically re-establish perfect synchronism between the moving and the stopped portions.

How these and other objects of my invention are accomplished may best be understood from references to the following description and the drawings in which:

Fig. 1 is a diagrammatic plan view showing a wrapper and a slicer with the driving connections between them formed in accordance with my invention;

Fig. 2 is a side elevation of a typical slicer shown in Fig. 1;

Fig. 3 is a similar side elevation of a typical wrapper shown in Fig. 1;

Fig. 4 is an end view of the wrapper on line 4—4 of Fig. 1;

Fig. 4a is a fragmentary view on line 4a—4a of Fig. 1 showing a clutch;

Fig. 5 is a plan view of the wrapper;

Fig. 6 is a perspective of a wrapped loaf of bread;

Fig. 7 is a vertical medial section of a clutch on line 7—7 of Fig. 1;

Fig. 8 is a fragmentary section on line 8—8 of Fig. 7;

Fig. 9 is a view similar to Fig. 8 when the clutch is disengaged, and with the addition of certain cooperative parts.

Fig. 2 illustrates a bread slicing machine of the type disclosed in my copending application filed Feb. 17, 1930, Ser. No. 429,050. Though I shall show and describe this slicer in connection with my invention it will be understood that any adaptable slicer may be substituted therefor. The frame is generally indicated at 10, and supported between two horizontal frame members is the transverse base 11. Mounted on base 11 is crankcase 12 which contains the crankshaft forming the preferred means for vertically reciprocating bread cutters 13. Standards 15 provide a frame to support the cutters. Power to drive the cutters is transmitted to them from motor 16, or other power source, by belt 17.

The preferred means for feeding the loaves of bread through the bread cutters is embodied in the rotary carrier generally indicated at 18. This carrier is composed of a plurality of disk rings between which cutters 13 work, the rings having radial arms that form between them laterally extending, peripheral bread carrying compartments. Said rings are rotatably mounted on the four grooved rollers 20 carried by rings 21 which are secured to the ends of base 11. Rotary carrier 18 is rotated in a counter-clockwise direction, as viewed in Fig. 2, to pass the bread through cutters 13, by means of a pair of starwheels 23 that have transverse rollers extending between the corresponding arms of the two starwheels. These rollers engage the under side of the radial arms of carrier 18 to drive it. Power is transmitted to starwheels 23 by chain 24 passing over sprocket 31 connected to drive shaft 25 by clutch 32 (Fig. 4a).

Chain 24 also drives sprocket 26 and this in turn drives through a pair of gears to drive belt roller 27 carried between frame members. Passing over roller 27 and roller 28 is belt 29 which moves toward rotary carrier 18. Bread is fed by belt 29 to the inverting stile generally indicated at 30, which is intermittently actuated by starwheels 23 to deposit a loaf, upside down, in a bread carrying compartment of carrier 18.

After passing through the cutters and while still in the rotary carrier, the cut loaves receive a tray 33 to hold the slices together so that the loaf may be handled as a unit. Application of the trays may be by any means, or by hand. On the descending side of the carrier 18, the loaves are held in place by wires 34 which release the loaves at the bottom of the carrier so they are deposited on the slicer discharge conveyor. This conveyor embodies means to accurately space the loaves of bread so that the interval between discharged loaves is always the same. In the typical form shown it comprises table 35 upon which the loaves are deposited and along which the loaves may be pushed by cleats 36 extending horizontally between chains 37 running one on each side of and parallel to table 35. Shaft 40, to which the sprocket driving chains 37 are attached (Fig. 3), has keyed to it sprocket 41 which is driven by chain 42 from sprocket 43 keyed to drive shaft 25 (Fig. 4a).

Figs. 3, 4 and 5 illustrate conventionally a typical bread wrapping machine; and though I show and describe this one type, it will be understood that my invention can be adapted to other wrapping machines without departing from the spirit thereof. I will explain such of the fundamental operations of the wrapper as are essential to an understanding of my invention but without going into unnecessary details, for these are well understood by those familiar with this art, the wrapper herein illustrated being a well-known one. The wrapper comprises generally a bread feed means indicated at 50, means to provide paper and wrap it around the loaf as the loaf passes through the wrapping means, hot plates indicated at 51 to seal the waxed paper, and conveying means indicated at 52 to pass the wrapped loaf through said sealing means, all mounted on a frame 54.

Power to drive the wrapper is transmitted from motor 55 (Fig. 4) by belt 56 to pulley 57 on hub 58 which rotates freely about shaft 60 though is adapted to be drivingly engaged thereto. This engagement is effected by clutch 61 by the pressing together of plate 62 on hub 58 and plate 62a on shaft 60, clutch handle 63 being provided to engage or disengage manually said plates. Shaft 60 is the primary power shaft and the moving parts are driven directly or indirectly therefrom.

The loaf feed means 50 (Fig. 3) is driven by chain 65 and bevel gears 66 from the secondary power shaft 67 which is driven by shaft 60 through suitable speed-reduction gearing 68. The feed means consists of a continuously moving endless chain 70 with vertical arms 71 adapted to push a loaf horizontally along plate 72 as indicated by the dotted-line loaf in position A of Fig. 4. Arms 71 intermittently feed the loaves into the wrapper, carrying them to position B of Fig. 4 where they come to rest. The loaves are placed directly on plate 72 at regular intervals by the discharge conveyor of the slicer, the wrapper and slicer being so placed relatively as to effect this direct transference. The discharge conveyor from the slicer is placed as in Fig. 1 to feed at right angles to wrapper feed means 50. The loaves are thus pushed transversely of feed means 50, from table 35 onto plate 72 to a position ahead of an advancing arm 71. Broadly considered, it is evident that feed means 50 may be of any type adapted to periodic bread feed, as, for example, a reciprocating means.

In position B the loaf is at the bottom of the wrapping means ready to receive the wrapper material, a sheet of paper from supply roll 73. Paper is fed over roll 74 on shaft 67, cam operated means, indicated generally at 75, being adapted to intermittently press the paper against roll 74 to cause the paper to be advanced. A sheet 76 is severed from the paper strip by suitable cutting means at 77 operatively connected by linkage 78 to shaft 67.

The means used to move the loaves from position B through the wrapping means, consists of a plurality of arms 90, attached in pairs to cross rods 91 mounted between vertical chains 92. Chains 92 are driven by sprockets on shaft 93 which is driven from shaft 67 by chain 94, which also drives shaft 95 for a purpose to be described. The construction and operation of arms 90 are known by those familiar with this art, and it is sufficient for my description that it be understood that arms 90 are adapted to vertical movement. Arms 90 pick up a loaf in position B (Fig. 3) and carry it vertically past side folding plates 96. The sheet of paper 76 has been passed through slots 97 in plates 96 and as the loaf is moved upward, the paper is folded down over the sides of the loaf thus forming the portion 76a of the wrapper as indicated in Fig. 6. Further vertical movement passes the loaf between spaced plates 98 (Fig. 4) so positioned as to fold the paper down over the ends of the loaf to form portions 76b of the wrapper. This last folding operation has left at each corner of the loaf an approximately triangular flap of paper of double thickness lying against plate 96. Folding spirals 99 (Fig. 4) are adapted to fold these flaps over against the ends of the loaf so that the portions 76c and 76d overlap the portion 76b, portion 76c being folded first.

This is the state of the wrapping when the loaf reaches position C, the top point to which it is carried by arms 90. In order to cover the bottom surface of the loaf, the loaf is held endwise between grips 100; and arms 90 are removed from beneath the loaf. These grips reciprocate toward and away from the ends of the loaf and are operated by suitable linkage 101 actuated by the inner faces of cams 102 attached to shaft 95. The folding of the paper over the loaf bottom is now accomplished in three movements, two of which occur while the loaf is held stationary. First, portion 76e of the wrapping paper is tucked under from one side of the loaf by means of side tucker 103 which is attached to shaft 104. Shaft 104 is pivotally mounted in frame 54, and is rocked by attached cam follower 105 actuated by engagement with the outer face of right hand cam 102 of Fig. 4. This rocking causes tucker 103 to move through the arc of a circle to fold the paper under the loaf at C. Next, portions 76f are tucked under the loaf by the reciprocating end tuckers 107 operated by suitable mechanism 108 actuated by cams 109 on shaft 93.

Cam 109 has sufficient dwell to hold tuckers 107 under the loaf for a short time. During this time, end grips 100 are retracted and the bread is supported only on the end tuckers. Immediately the loaf is released from grips 100, it is engaged by one of pushers 110 which are provided for moving the loaves horizontally over hot plates 51. These cross bars are carried between endless chains driven by sprockets on shaft 95. As the bread is moved off the end tuckers, it passes over stationary plate 113, which movement folds the third and last portion of the paper under the loaf, portion 76g, which now overlaps all the other paper on the bottom.

The loaf is then passed over and between plates 51 which are heated to melt the wax on the paper on the ends and bottom and thus seal the package. After leaving the sealing means, the loaves are passed over an extension 114, alined with the hot plates, where the bread is cooled before being deposited on a second discharge belt conveyor 115. End keepers 116 hold the ends of the wrapping paper in place until the wax cools and sets.

Having described the slicer and the wrapper, and the characteristic functions of each, I shall now describe my means of synchronizing the operations of the two machines. The first step is to provide a connection to a common power source which is done by driving shaft 25 from the primary power shaft 60 by chain 120. Sprocket 121 (Fig. 7), driven by chain 120, is disengagedly connected to shaft 25 by means of clutch 122 operated by handle and linkage 123.

It is desirable that some type of over-load clutch be incorporated in the driving connections between shaft 25 and shaft 60. This is here accomplished by rotatably mounting sprocket 121 on the hub of the driving clutch member 125, nut 126 holding the sprocket against lateral movement. A load-transmitting connection between these two parts is secured by balls 127, in bosses 128 on clutch member 125, being spring pressed into depressions in sprocket 121. The pressure of springs 129 is adjustable so that the amount of load transmitted may be varied. Where more than one ball 127 is used, the radial distances from the shaft axis to the different balls are unequal so that for only one position of sprocket 121 relative to clutch 122 will power be transmitted. The reasons for this will be apparent later.

The driving member 125 is mounted on shaft 25 to rotate freely thereon; and consists chiefly of a circular hub portion having a recess 130. The driven member is collar 131 keyed to shaft 25 and fitting into recess 130. Collar 131 carries a pawl 132 (Fig. 8) mounted on pivot 135 near the periphery of the driven clutch member. The pawl is normally urged outwardly to the position of Fig. 8 by spring 134. In this position pawl 132 engages notch 132b in the wall of recess 130 whereby driving member 125, rotating counter-clockwise in Fig. 8, drives collar 131 and shaft 25. The driving hub is kept positioned with respect to the fixed driven member by shaft bearing 136 or other suitable means for preventing motion along the shaft.

The clutch disengaging mechanism comprises disk 138 mounted on shaft 25, with flange 139 projecting from the disk periphery for approximately half its circumference. This disk is adapted to be moved along shaft 25 by the rocking of arm 140, a part of the manually operated clutch operating linkage 123. When disk 138 is withdrawn to the left as viewed in Fig. 7 so that flange 139 clears collar 131, the driving connection is established by pawl 132 engaging notch 132b. When the clutch is to be disengaged, disk 138 is advanced to the right where flange 139 covers the path of pawl 132. In this position flange 139 is adapted to depress pawl 132 (Fig. 9) so that it no longer can engage notch 132b and consequently shaft 25 stops.

It will be noticed that if, when flange 139 is advanced to operative position, the pawl is under the flange, the clutch is immediately disengaged. This is made possible by beveling the corners of the flange and pawl at 139a and 132a respectively. At any other position of the pawl, disengagement of the clutch is delayed after the movement of flange 139 to the right until such time as the pawl passes thereunder. Hence there is only a certain period during each revolution of shaft 25 when it may be stopped; the length of this period being determined by the circumferential length of flange 139 and the location of the period by the angular displacement or rotation of flange 139 relative to shaft 25. Furthermore, when the clutch is re-engaged, the driving and driven members resume the same relative positions they occupied at the time of disengaging for there is but one driving notch 132b.

Shaft 25, as above described, drives the slicer. Chain 42 driving the slicer discharge means (Figs. 2 and 4) passes over sprocket 43 keyed to shaft 25; therefore loaves deposited on table 35 are moved forward to the wrapper feed means 50 when shaft 25 rotates. Chain 24 driving the rotary bread carrier and feed means passes over sprocket 31. Sprocket 31 is integral with the driven element 141 of clutch 32 which is adapted to slide along shaft 25, while the driving member 142 is pinned to shaft 25. The clutch members each have a single complementary tooth adapted to establish a driving connection between the two members when they are moved together by the rocking of arm 143, operated manually by handle and rod 144.

The ratio of the sprockets for chain 120 is such that shaft 25 makes exactly one revolution for each loaf of bread passed through the wrapper. In other words, each time a given point on shaft 25 occupies a given position, loaves in the wrapper occupy the same various positions. The sprockets on chain 24 are of such ratio that one loaf is passed through cutters 13 for each revolution of shaft 25; and the ratio of sprockets on chain 42, taken in connection with the spacing of cleats 36, is such that one loaf of bread is delivered to wrapper feed 50 per revolution of shaft 25. Thus the wrapper is taken as a base, which is preferable from a practical standpoint, and shaft 25 synchronized therewith; and the slicer is timed with shaft 25 for the same rate of bread handling.

The three clutches are so located that when it is desired to stop any part of the mechanism, those parts operating on the bread prior to the stopped part are also stopped. This prevents the bread piling up at any point faster than it can be handled and prevents damage to the loaves. However, mechanisms operating on the bread subsequent to the stopped one are kept in motion where necessary, for if a loaf were to be stopped on hot plates 51 for any appreciable length of time the waxed paper would become hot enough to ignite. Hence, conveying means passing the bread over said hot plates must remain in operation to clear the hot plates of any bread in the wrapper.

The wrapper is capable of independent operation. With clutch 61 in and clutch 122 out, the wrapper operates without moving any part of the slicer. When it is desired to start the slicer, clutch 122 is engaged and, since there is only one position of the clutch wherein driving engagement is possible, shaft 25 is automatically placed in step with master power shaft 60. As soon as shaft 25 starts, the slicer discharge means driven by chain 42 starts so that at any time the slicer is working the discharge means is working and is always locked in synchronism with shaft 25 and shaft 60. This discharge conveyor is timed with reference to wrapper feed means 50 so that the loaves are fully deposited on plate 72 by the time arms 71 engage the loaves. Each loaf must be fully and accurately on plate 72; otherwise it will catch on the wrapper frame and be crushed so that the machine must be stopped and the débris removed. Thus it is evident that precision in delivering loaves onto the wrapper feed is vital. When clutch 32 is engaged, the rotary carrier 18 and allied feeding mechanism start. Clutch 32, having only a single driving tooth, can only start the carrier at the correct time in the revolution of shaft 25 so that bread is deposited on table 35 of the slicer discharge means at the correct time and rate. This arrangement of clutches makes it impossible to operate the slicer unless the discharge conveyor is operating to remove sliced bread; and it is also impossible to run the slicer without the wrapper, so all sliced bread necessarily passes into and through the wrapper.

If now clutch 61 is disengaged, all the moving parts of both slicer and wrapper will stop but will remain locked so that there is no relative motion. If clutch 122 is let out, the slicer and discharge conveyor stop and the wrapper only would remain running. When the slicer discharge stops it must not stop with a loaf incompletely delivered, i. e., with the loaf partially on plate 72 so that arm 71 will engage it but not feed it correctly. It is to prevent stopping the discharge conveyor except between successive loaf deliveries that the particular construction of clutch 122 above described is provided. Flange 139 is so located that when a loaf is partially onto plate 72 the clutch will not disengage until the loaf is entirely on, but the following loaf is still clear of arms 71. Flange 139 will then depress pawl 132 and shaft 25 stops. During the period beginning when one loaf has been substantially fully positioned on plate 72 and ending just before the next succeeding loaf is moved into the path of an arm 71—leaving a short space for a reasonable margin of safety, pawl 132 is passing through that part of its path where it is covered by flange 139, and if the clutch handle is operated during this period, the clutch is immediately disengaged. But after the loaf has partially but not fully entered the path of arms 71, so that contact with them would improperly feed and thereby damage the loaf, pawl 132 is passing through that portion of a revolution in which it cannot be contacted by flange 139 (the lower half of a revolution as seen in Fig. 9). With clutch 122 out, the wrapper is still operating and any bread delivered to feed means 50 will be passed clear through the wrapper. In any case, re-engagement of clutch 122 will automatically pick up the load at the exact point at which it was dropped regardless of the time of engaging the clutch. When clutch 32 is let out nothing stops except rotary carrier 18 and its feeding mechanism. Any bread delivered onto table 35 will be picked up by cleats 36 and carried to the wrapper so that bread is cleared from both machines and especially from hot plates 51.

It will be understood the drawings and description are to be considered merely as illustrative of and not restrictive on the broader claims appended hereto, for various changes in design, structure and arrangement may be made without departing from the spirit and scope of said claims.

I claim:

1. In combination, a bread slicer operating to slice loaves of bread and deliver the sliced bread at regular intervals, bread wrapping mechanism adapted to take bread delivered from the slicer and to wrap the sliced loaves, a primary drive shaft from which the wrapping mechanism is driven independently of the slicer, and disconnectable driving means whereby the bread slicer is driven from said primary drive shaft, said disconnectable driving means comprising a driven shaft adapted to make one revolution per loaf delivery of said slicer and a disengageable clutch mounted on said shaft the members of which are adapted to be engaged at only a single relative rotational position.

2. In combination, a bread slicer operating to slice loaves of bread and deliver the sliced bread at regular intervals, bread wrapping mechanism adapted to take bread delivered from the slicer and to wrap the sliced loaves, a primary drive shaft from which the wrapping mechanism is driven independently of the slicer, and disconnectable driving means whereby the bread slicer is driven from said primary drive shaft, said disconnectable driving means comprising a driven shaft making a definite angle of rotation per loaf delivery of said slicer and a disengageable clutch mounted on said shaft the members of which are engageable only at positions angularly spaced equal to said loaf-delivery angle of rotation of said driven shaft.

3. In combination, a bread slicer operating to slice loaves of bread and deliver the sliced bread at regular intervals, bread wrapping mechanism adapted to take bread delivered from the slicer and to wrap the sliced loaves, a primary drive shaft from which the wrapping mechanism is driven independently of the slicer, and disconnectable driving means whereby the bread slicer is driven from said primary drive shaft, said disconnectable driving means being adapted to automatically re-establish synchronism between said slicer and said wrapper when said driving means is re-connected to said primary drive shaft.

4. In combination, a bread slicer operating to slice loaves of bread, a wrapping mechanism adapted to take bread delivered from the slicer and to wrap the sliced loaves, a discharge conveyor adapted to receive the sliced loaves from said slicer and deliver the loaves at regular intervals to said wrapper, a primary drive shaft from which said wrapping mechanism is driven independently of the slicer, and disconnectable driving means whereby said slicer and said discharge conveyor are driven from the primary drive shaft; said disconnectable driving means including a disengageable clutch to disengage both said slicer and said discharge conveyor, and a second disengageable clutch to disengage said slicer only.

5. In combination, a bread slicer operating to slice loaves of bread, a wrapping mechanism adapted to take bread delivered from the slicer and to wrap the sliced loaves, a discharge conveyor adapted to receive the sliced loaves from said slicer and deliver said loaves at regular intervals to said wrapper, a primary drive shaft from which said wrapping mechanism is driven independently of the slicer, and disconnectable driving means whereby said slicer and said discharge conveyor are driven from the primary drive shaft; said disconnectable driving means including a disengageable clutch to disengage both said slicer and said discharge conveyor, a second disengagable clutch to disengage said slicer only, each of said clutches being engageable at only a single relative rotational position, and a shaft, on which both of said clutches are mounted, making one revolution per loaf delivery of said discharge conveyor.

6. In combination, a bread slicer operating to slice loaves of bread, a wrapping mechanism adapted to take bread delivered from the slicer and to wrap the sliced loaves, a discharge conveyor adapted to receive the sliced loaves from said slicer and deliver the loaves at regular intervals to said wrapper, a primary drive shaft from which said wrapping mechanism is driven independently of the slicer, and disconnectable driving means whereby said slicer and said discharge conveyor are driven from the primary drive shaft; said disconnectable driving means comprising a driven shaft making a definite angle of rotation per loaf delivery of said discharge conveyor, a disengageable clutch mounted on said driven shaft to disengage both said slicer and said discharge conveyor, and a second disengageable clutch mounted on said driven shaft to disengage said slicer only, both of said clutches being engageable only at positions angularly spaced equal to said loaf-delivery angle of rotation of said driven shaft.

7. In combination a slicer operating to slice loaves of bread, a discharge conveyor on said slicer, a wrapping mechanism adapted to take loaves delivered from said slicer and wrap the sliced loaves, feed means on said wrapper, said discharge means being adapted to deliver sliced loaves to said wrapper feed means in timed relation thereto, a primary power shaft from which said wrapping mechanism is driven independently of the slicer, and disconnectable driving means whereby said slicer and discharge conveyor are driven from the primary power shaft; said disconnectable driving means including a disengageable clutch to disengage said discharge conveyor, said clutch being adapted to disengage only between periods of bread delivery to said wrapper feed means, and said clutch also being adapted upon reengagement to re-establish synchronism between said discharge conveyor and said wrapper feed means.

8. In combination, a bread slicer operating to slice loaves of bread, a wrapping mechanism adapted to take bread delivered from the slicer, to wrap the sliced loaves, and to seal the loaf wrapping by heated sealing means, a discharge conveyor adapted to receive the sliced loaves from said slicer and deliver said loaves at regular intervals to said wrapper, a primary drive shaft from which said wrapping mechanism is driven independently of the slicer, and disconnectable driving means whereby said slicer and said discharge conveyor are driven from the primary drive shaft; said disconnectable driving means including a disengageable clutch to disengage both said slicer and said discharge means, and a second disengageable clutch to disengage said slicer only, so constructed and arranged that said wrapping mechanism continuously feeds through said heated sealing means when either of said clutches is disengaged.

9. In combination, a bread slicer operating to slice loaves of bread, a wrapping mechanism adapted to take bread delivered from the slicer and to wrap the sliced loaves, a discharge conveyor adapted to receive the sliced loaves from said slicer and deliver said loaves at regular intervals to said wrapper, a primary drive shaft from which said wrapping mechanism is driven independently of the slicer, and disconnectable driving means whereby said slicer and said discharge conveyor are driven from the primary drive shaft; said disconnectable drive means including a driven shaft making a definite angle of revolution per loaf delivery of said discharge conveyor, a disengageable clutch mounted on said driven shaft to disengage said slicer and said discharge conveyor, said clutch comprising an overload release adapted to drive only at points angularly spaced equal to the loaf-delivery angle of said driven shaft, positive drive means drivingly engageable only at points angularly spaced equal to said loaf delivery angle of said driven shaft and means to release said drive means, operable only during predetermined portions of the revolution of said driven shaft, and a second disengageable clutch mounted on said driven shaft, to disengage said slicer only, engageable only at points angularly spaced equal to said loaf-delivery angle of said driven shaft.

10. In combination, a bread slicer operating to slice loaves of bread, a wrapping mechanism adapted to take bread delivered from the slicer and to wrap the sliced loaves, a discharge conveyor adapted to receive the sliced loaves from said slicer and deliver said loaves at regular intervals to said wrapper, a primary drive shaft from which said wrapping mechanism is driven independently of the slicer, and disconnectable driving means whereby said slicer and said discharge conveyor are driven from the primary drive shaft; said disconnectable drive means including a driven shaft making a single revolution per loaf delivery of said discharge conveyor, a disengageable clutch mounted on said driven shaft to disengage said slicer and said discharge conveyor, said clutch comprising positive drive means adapted to drive only at a single relative rotational point, and means to release said drive means, operable only during a predetermined portion of a revolution of said driven shaft, and a second disengageable clutch mounted on said driven shaft, to disengage said slicer only, engageable only at a single relative rotational point.

11. In combination, a bread slicer operating to slice loaves of bread and deliver the sliced bread at regular intervals, bread wrapping mechanism adapted to take bread delivered from the slicer and to wrap the sliced loaves, a primary drive shaft from which the wrapping mechanism is driven independently of the slicer, and disconnectable driving means whereby the bread slicer is driven from said primary drive shaft; said disconnectable drive means including a driven shaft making a definite angle of revolution per loaf delivery of said slicer and a disengageable clutch on said driven shaft to disengage said slicer; said clutch comprising an overload release adapted to drive only at points angularly spaced equal to the loaf-delivery angle of said driven shaft, positive drive means drivingly engageable only at points angularly spaced equal to said loaf-delivery angle of said driven shaft, and means to release said drive means, operable only during predetermined portions of the revolution of said driven shaft.

12. In combination, a bread slicer operating to slice loaves of bread and deliver the sliced bread at regular intervals, bread wrapping mechanism adapted to take bread delivered from the slicer and to wrap the sliced loaves, a primary drive shaft from which the wrapping mechanism is driven independently of the slicer, and disconnectable driving means whereby the bread slicer is driven from said primary drive shaft; said disconnectable drive means including a driven shaft making a single revolution per loaf delivery of said slicer, a disengageable clutch mounted on said driven shaft to disengage said slicer, said clutch comprising positive drive means adapted to drive only at a single relative rotational point, and means to release said drive means, operable only during a predetermined portion of a revolution of said driven shaft.

13. In combination, slicing means for slicing loaves of bread, loaf wrapping means for wrapping said sliced loaves of bread, heated sealing means for sealing said wrapped loaves of sliced bread, a series of feeding mechanisms for normally feeding said loaves of bread continually and automatically through said slicing, wrapping and heated sealing means, said series of feeding mechanisms including slicer feeding means for feeding said loaves of bread through said slicing means, wrapper feeding means for feeding said sliced loaves of bread through said wrapping means, and sealing feeding means for feeding said wrapped loaves of sliced bread through said heated sealing means, means for driving said slicer feeding means and said wrapper feeding means together from a common power source in synchronized step with each other, and means permitting the stopping and subsequent restarting of said slicer feeding means without stopping said wrapper feeding means or said sealing feeding means, to thereby permit the stopping of said slicing operation while still continuing the feeding of loaves through said wrapping and heated sealing means to clear the sliced loaves from the latter.

14. In combination, slicing means for slicing loaves of bread, loaf wrapping means for wrapping said sliced loaves of bread, heated sealing means for sealing said wrapped loaves of sliced bread, a series of feeding mechanisms for normally feeding said loaves of bread continually and automatically through said slicing, wrapping and heated sealing means, said series of feeding mechanisms, including slicer feeding means for feeding said loaves of bread through said slicing means, wrapper feeding means for feeding said sliced loaves of bread through said wrapping means, and sealing feeding means for feeding said wrapped loaves of sliced bread through said heated sealing means, means for driving said slicer feeding means and said wrapper feeding means together from a common power source in synchronism with each other, and clutch means adapted to be disengaged for stopping said slicer feeding means without stopping said wrapper feeding means or said sealing feeding means, said clutch means when re-engaged to re-start said slicer feeding means being adapted to automatically re-synchronize said slicer feeding means with said wrapper feeding means.

15. In combination, slicing means for slicing loaves of bread, loaf wrapping means for wrapping said sliced loaves of bread, heated sealing means for sealing said wrapped loaves of sliced bread, a series of feeding mechanisms for normally feeding said loaves of bread continually and automatically through said slicing, wrapping and heated sealing means, said series of feeding mechanisms, including slicer feeding means for feeding said loaves of bread through said slicing means, slicer discharge means to deliver sliced loaves from said slicer feed means, wrapper feeding means to receive the sliced loaves and to feed said sliced loaves of bread through said wrapping means, and sealing feeding means for feeding said wrapped loaves of sliced bread through said heated sealing means, said wrapper feeding means including a plurality of feeder members for moving said sliced loaves of bread toward said wrapping means and said slicer discharge means being adapted to deliver said sliced loaves of bread into the path and influence of said feeder members and in correct timed relation thereto, and means for driving said slicer feeding and discharge means and said wrapper feeding means together from a common power source in synchronized step with each other, said driving means including clutch mechanism adapted to be disengaged for stopping said slicer feeding and discharge means without stopping said wrapper feeding means or said sealing feeding means, said clutch mechanism when re-engaged to re-start said slicer feeding and discharge means being adapted to automatically re-synchronize said slicer feeding means and discharge means with said wrapper feeding means so that the discharge means again feeds and delivers sliced loaves of bread into the path and influence of said feeder members comprising part of said wrapper feeding means all in correct timed relation thereto.

16. In combination, slicing means for slicing loaves of bread, loaf wrapping means for wrapping said sliced loaves of bread, heated sealing means for sealing said wrapped loaves of sliced bread, a series of feeding mechanisms for normally feeding said loaves of bread continually and automatically through said slicing, wrapping, and heated sealing means, said series of feeding mechanisms, including slicer feeding means for feeding said loaves of bread through said slicing means, wrapper feeding means for feeding said sliced loaves of bread through said wrapping means, and sealing feeding means for feeding said wrapped loaves of sliced bread through said heated sealing means, means for driving said slicer feeding means and said wrapper feeding means together from a common power source in synchronism with each other, and synchronizing clutch means adapted to be disengaged for stopping said slicer feeding means without stopping said wrapper feeding means or said sealing feeding means, said clutch means when reengaged to re-start said slicer feeding means being adapted to automatically re-synchronize said slicer feeding means without said wrapper feeding means; said synchronizing clutch comprising a rotating driven element, a rotating driving element, means to drivingly connect said driving and driven elements in predetermined definite relative rotational position, and clutch release means operable to render said clutch connecting means inoperative during a definite portion of a revolution of said driven clutch element.

17. In combination, slicing means for slicing loaves of bread, loaf wrapping means for wrapping said sliced loaves of bread, heated sealing means for sealing said wrapped loaves of sliced bread, a series of feeding mechanisms for normally feeding said loaves of bread continually and automatically through said slicing, wrapping, and heated sealing means, said series of feeding mechanisms, including slicer feeding means for feeding said loaves of bread through said slicing means, wrapper feeding means for feeding said sliced loaves of bread through said wrapping means, and sealing feeding means for feeding said wrapped loaves of sliced bread through said heated sealing means, means for driving said slicer feeding means and said wrapper feeding means together from a common power source in synchronism with each other, and synchronizing clutch means adapted to be disengaged for stopping said slicer feeding means without stopping said wrapper feeding means or said sealing feeding means, said clutch means when reengaged to re-start said slicer feeding means being adapted to automatically re-synchronize said slicer feeding means with said wrapper feeding means; said synchronizing clutch comprising a rotating driven element, a rotating driving element, means to drivingly connect said driving and driven elements in predetermined definite rotational position, clutch release means operable to render said clutch connecting means inoperative during a definite portion of a revolution of said driven clutch element, and a combined overload release and non-reversible drive means comprising a drive sprocket rotatably mounted on the driving clutch element and adjustable frictional means to drivingly engage the sprocket and driving element at a predetermined relative rotational position.

18. In combination, slicing means for slicing loaves of bread, loaf wrapping means for wrapping said sliced loaves of bread, heated sealing means for sealing said wrapped loaves of sliced bread, a series of feeding mechanisms for normally feeding said loaves of bread continually and automatically through said slicing, wrapping, and heated sealing means, said series of feeding mechanisms, including slicer feeding means for feeding said loaves of bread through said slicing means, wrapper feeding means for feeding said sliced loaves of bread through said wrapping means, and sealing feeding means for feeding said wrapped loaves of sliced bread through said heated sealing means, means for driving said slicer feeding means and said wrapper feeding means together from a common power source in synchronism with each other, and synchronizing clutch means adapted to be disengaged for stopping said slicer feeding means without stopping said wrapper feeding means or said sealing feeding means, said clutch means when reengaged to re-start said slicer feeding means being adapted to automatically re-synchronize said slicer feeding means with said wrapper feeding means; said synchronizing clutch comprising a rotating driven clutch element, a driving pawl on the driven element, a rotating driving clutch element having a pawl-receiving notch adapted to receive said pawl to drivingly connect said driving and driven elements, clutch release means comprising an arcuate pawl depressing member adapted when in the path of said pawl to prevent engagement of said pawl with said notch during a definite portion of a revolution of said driven clutch element, and overload release means comprising a driving wheel rotatably mounted on said driving clutch element and means to secure adjustable frictional driving engagement between said sprocket driving wheel and said driving element, said frictional engaging means being engageable only at a definite relative rotational point.

19. In combination, a bread slicer operating to slice loaves of bread, a discharge conveyor on the slicer to deliver sliced loaves, bread wrapping mechanism to wrap a sliced loaf, an infeed conveyor on the wrapper to receive sliced loaves from the slicer discharge conveyor and take them to the wrapping mechanism, said slicer discharge conveyor being adapted to move loaves into the path of the moving elements of the infeed conveyor, a common drive shaft from which the wrapper is driven independently of the slicer, and drive means to drive the slicer in synchronism with the wrapper from the common shaft, said drive means including a clutch disengageable to stop the slicer independently of the wrapper, and means to prevent disengagement of the clutch when a loaf has been moved partially but not completely into the path of the infeed conveyor elements.

20. In combination, slicing means for slicing loaves of bread, loaf wrapping means for wrapping said sliced loaves of bread, heated sealing means for sealing said wrapped loaves of sliced bread, feeding mechanisms for normally feeding said loaves of bread continually and automatically through said slicing, wrapping and heated sealing means, said feeding mechanisms including slicer feeding means for feeding said loaves of bread through said slicing means, and wrapper and sealer feeding means for feeding said sliced loaves of bread through said wrapping and sealing means, means for driving said slicer feeding means and said wrapper and sealer feeding means together from a common power source in synchronism with each other, and clutch means adapted to be disengaged for stopping said slicer feeding means without stopping said wrapper and sealer feeding means, said clutch means when re-engaged to re-start said slicer feeding means being adapted to automatically re-synchronize said slicer feeding means with said wrapper and sealer feeding means.

WILLIAM WALTER HARTMAN.